United States Patent
Enomoto

(10) Patent No.: US 8,184,331 B2
(45) Date of Patent: May 22, 2012

(54) PRINTING DEVICE AND METHOD THEREFOR

(75) Inventor: Katsunori Enomoto, Aichi (JP)

(73) Assignee: Brother Kogyo Kabushiki Kaisha, Aichi (JP)

( * ) Notice: Subject to any disclaimer, the term of this patent is extended or adjusted under 35 U.S.C. 154(b) by 912 days.

(21) Appl. No.: 12/235,113

(22) Filed: Sep. 22, 2008

(65) Prior Publication Data
US 2009/0080007 A1 Mar. 26, 2009

(30) Foreign Application Priority Data
Sep. 25, 2007 (JP) ................. 2007-247229

(51) Int. Cl.
*G06F 15/00* (2006.01)
*G03G 21/18* (2006.01)
(52) U.S. Cl. ........................ 358/1.2; 399/113
(58) Field of Classification Search .................. 358/1.2, 358/1.15, 1.14, 1.16, 1.18, 1.9, 1.1, 1.12; 399/111, 113, 106, 263, 120; 428/411.1, 428/532, 533
See application file for complete search history.

(56) References Cited

U.S. PATENT DOCUMENTS
2004/0252314 A1* 12/2004 Takahashi ...................... 358/1.1

FOREIGN PATENT DOCUMENTS
| JP | 7-123228 | 5/1995 |
| JP | 9-191381 | 7/1997 |
| JP | 11-240226 | 9/1999 |
| JP | 2002-311753 | 10/2002 |
| JP | 2003-025679 | 1/2003 |
| JP | 2004-302752 | 10/2004 |
| JP | 2006-235932 | 9/2006 |
| JP | 2007-158817 | 6/2007 |

OTHER PUBLICATIONS

Japanese Official Action dated Dec. 8, 2009 together with an English language translation.

* cited by examiner

*Primary Examiner* — Saeid Ebrahimi Dehkordy
(74) *Attorney, Agent, or Firm* — Scully, Scott, Murphy & Presser, P.C.

(57) ABSTRACT

A printing device includes a receiving unit receiving image data, a printing unit transferring printing agent onto a sheet so as to form an image according to the image data received, a printing ratio determining unit determining, based upon the image data, a printing ratio that is a ratio of an area to be filled with the printing agent on the sheet to a whole area of the sheet, a first determining unit determining whether the printing ratio determined is equal to or more than a first predetermined value that is a printing ratio at less than which the sheet is classified into a recyclable sheet when the printing agent is transferred onto the sheet, and a control unit controlling the printing unit to transfer the printing agent onto the sheet depending on the determination by the first determining unit.

30 Claims, 11 Drawing Sheets

PRINTING DEVICE AND METHOD THEREFOR

CROSS-REFERENCE TO RELATED APPLICATION

This application claims priority under 35 U.S.C. §119 from Japanese Patent Application No. 2007-247229 filed on Sep. 25, 2007. The entire subject matter of the application is incorporated herein by reference.

BACKGROUND

1. Technical Field

The following description relates to one or more printing techniques to print an image corresponding to inputted image data on a sheet, particularly to one or more printing techniques to perform printing such that a printed sheet is recyclable.

2. Related Art

Recently, sheet recycling has been emphasized more and more while global environmental issues have been exacerbated year by year. When a printed sheet is recycled, the printed sheet is required to be sorted in accordance with a recycling classification thereof previously determined based upon a printing ratio as a ratio of printed areas to a whole area on the printed sheet. Thus, a printing device has been proposed, which is configured to, when printing a desired image on a sheet, determine a recycling classification of the printed sheet based upon a printing ratio of the image and a sort of the sheet, and to print information on the recycling classification as determined together with the image (for example, see Japanese Provisional Publication No. 2004-302752).

SUMMARY

However, the aforementioned printing device cannot take automatic print control to sort each printed sheet into an intended recycling classification. Therefore, when a user wishes to sort each printed sheet into an intended recycling classification, the user has to modify inputted image data as needed. However, image data such as facsimile data may be inputted into the printing device without relation to a user's intension. In such a case, a printed sheet might be unrecyclable.

Aspects of the present invention are advantageous to provide one or more improved printing devices that make it possible to prevent a printed sheet from being unrecyclable.

According to aspects of the present invention, a printing device is provided, which includes a receiving unit configured to receive image data, a printing unit configured to transfer printing agent onto a sheet so as to form an image according to the image data received by the receiving unit, a printing ratio determining unit configured to determine, based upon the image data, a printing ratio that is a ratio of an area to be filled with the printing agent on the sheet to a whole area of the sheet, a first determining unit configured to determine whether the printing ratio determined by the printing ratio determining unit is equal to or more than a first predetermined value that is a printing ratio at less than which the sheet is classified into a recyclable sheet when the printing agent is transferred onto the sheet, and a control unit configured to control the printing unit to transfer the printing agent onto the sheet depending on the determination made by the first determining unit.

In some aspects, the printing ratio determining unit determines a printing ratio as a ratio of an area to be filled with the printing agent on the sheet to the whole area of the sheet. Then, the first determining unit determines whether the printing ratio determined is equal to or more than the first predetermined value as an upper limit of a printing ratio for a recyclable sheet. Then, the control unit controls the printing unit to transfer the printing agent onto the sheet depending on the determination made by the first determining unit. Thus, since the control unit controls a printing operation based upon the determination on whether the printing ratio determined is equal to or more than the upper limit of a printing ratio for a recyclable sheet, it is possible to prevent the printed sheet from being unrecyclable.

According to aspects of the present invention, farther provided is a method to transfer printing agent onto a sheet and form an image according to image data on the sheet. The method includes a printing ratio determining step of determining, based upon the image data, a printing ratio that is a ratio of an area to be filled with the printing agent on the sheet to a whole area of the sheet, a first determining step of determining whether the printing ratio determined in the printing ratio determining step is equal to or more than a first predetermined value that is a printing ratio at less than which the sheet is classified into a recyclable sheet when the printing agent is transferred onto the sheet, and a transferring step of transferring the printing agent onto the sheet depending on the determination made in the first determining step.

The method adopted as above can provide the same effect as the aforementioned printing device.

BRIEF DESCRIPTION OF THE ACCOMPANYING DRAWINGS

DETAILED DESCRIPTION

It is noted that various connections are set forth between elements in the following description. It is noted that these connections in general and, unless specified otherwise, may be direct or indirect and that this specification is not intended to be limiting in this respect. Aspects of the invention may be implemented in computer software as programs storable on computer-readable media including but not limited to RAMs, ROMs, flash memory, EEPROMs, CD-media, DVD-media, temporary storage, hard disk drives, floppy drives, permanent storage, and the like.

Hereinafter, embodiments according to aspects of the present invention will be described with reference to the accompany drawings.

Overall Configuration of Multifunction Peripheral

Figure 1:
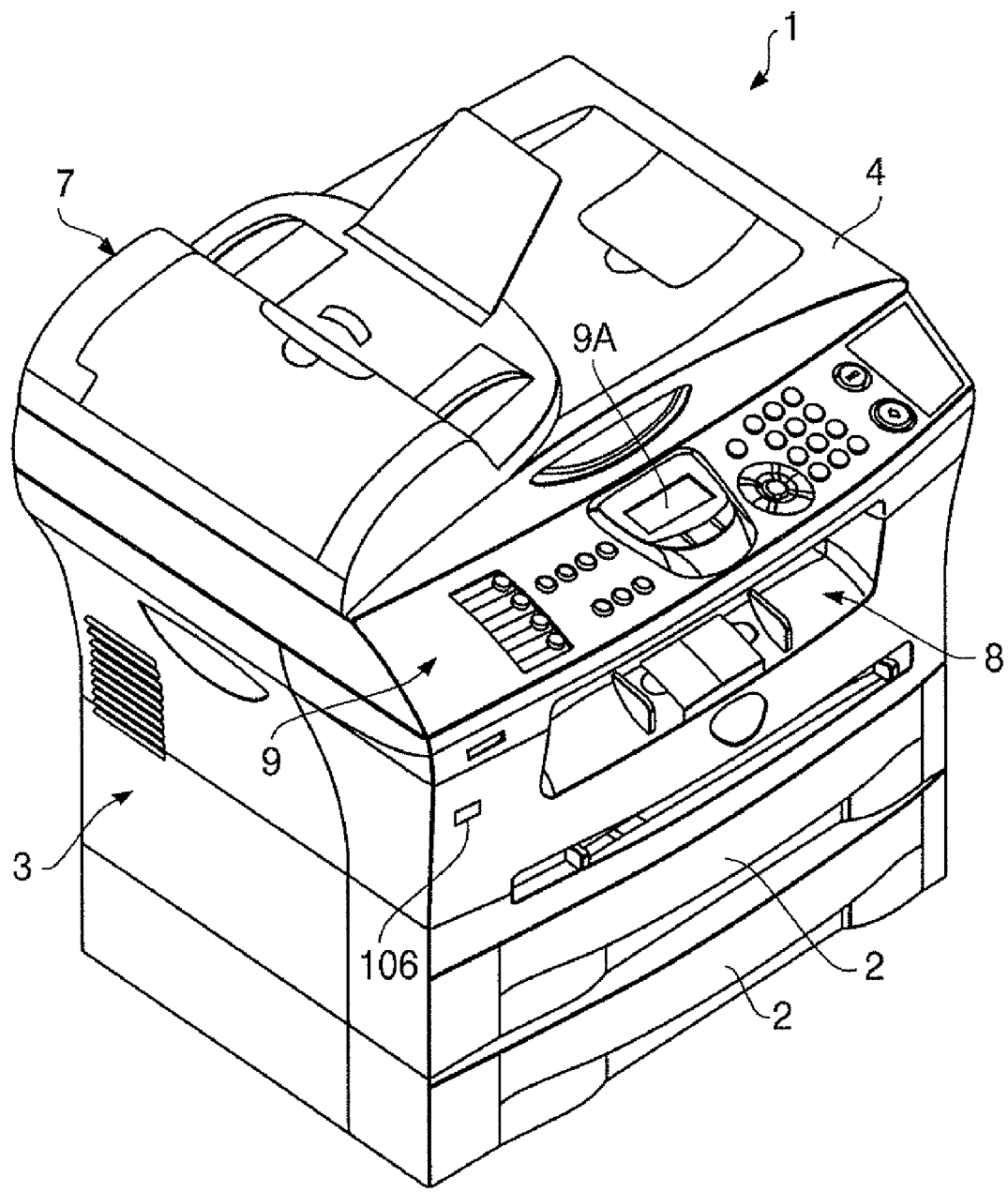
FIG. 1 is an external view schematically showing a configuration of a multifunction peripheral (MFP) in embodiments according to one or more aspects of the present invention.

FIG. 1 is an external view schematically showing a configuration of a multifunction peripheral (MFP) 1 as an image forming device according to aspects of the present invention. As shown in FIG. 1, the MFP 1 is provided with a plurality of sheet feed trays 2 configured to feed a sheet P (see FIG. 3) on which an image is formed, a main body 3 configured to form an image on the sheet P fed from one of the sheet feed trays 2, and a main body cover 4 supported by the main body 3 in an openable and closable manner so as to completely cover an upper face of the main body 3.

The main body 3 includes therein a scanning unit 5 (see FIG. 2) configured to scan an image formed on an original document G (see FIG. 2) and an image forming unit 6 (see FIG. 3) configured to form an image on the sheet P fed from one of the sheet feed trays 2. The scanning unit 5 is a known one that scans an image formed on the original document G which is placed on a scanning surface 3A (see FIG. 2) provided on the upper face of the main body 3 or carried by an automatic document feeding unit 7 with a configuration described below. Additionally, the image forming unit 6 is configured as a known printer engine that forms an image in an electrophotographic method with yellow toner, magenta toner, cyan toner, and black toner. The image forming unit 6 forms an image on the sheet P on a sheet-by-sheet basis and discharges the sheet P with the image formed thereon from a discharge slot 8. Further, an operation panel 9 is provided on the upper face of the main body 3, which includes a liquid crystal display (LCD) 9A and various kinds of buttons.

[Configurations of Main Body Cover and Scanning Unit]

Figure 2:
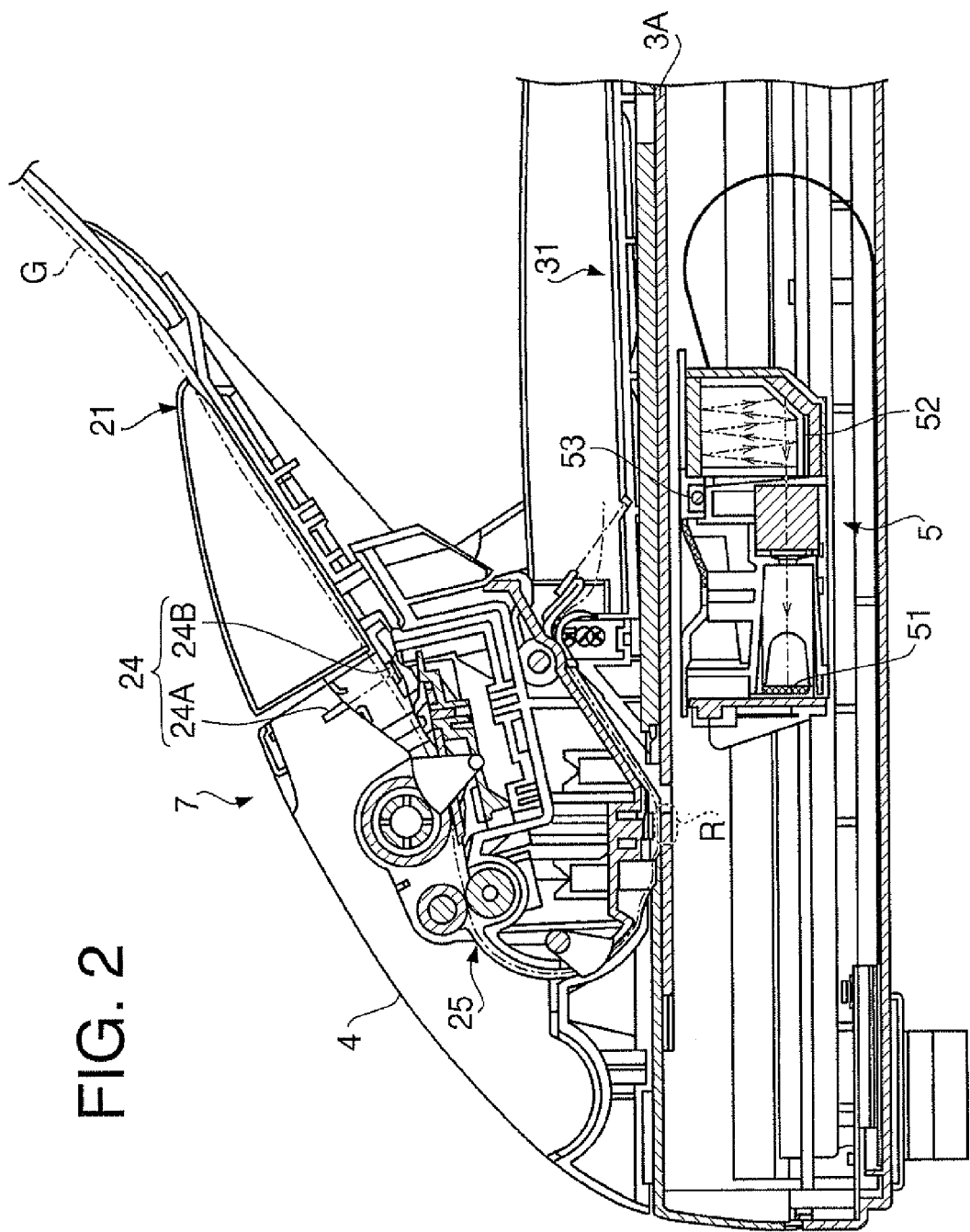
FIG. 2 is a cross-sectional view schematically showing a configuration of the MFP including a main body cover and a scanning unit in the embodiments according to one or more aspects of the present invention.

FIG. 2 is a cross-sectional view schematically showing configurations of the main body cover 4 and the scanning unit 5. As illustrated in FIG. 2, the main body cover 4 includes a loading portion 21 configured to be loaded with the original document C which is about to be scanned by the scanning unit 5, a stacker portion 31 on which the original document G scanned by the scanning unit 5 is stacked, and a carrying unit 25 that carries the original document G from the loading portion 21 to the stacker portion 31 via the scanning surface 3A (namely, which carries the original document G to the stacker portion 31 after letting the scanning unit 5 held in a scanning position R in automatic document feeding scan the original document G). Thus, the automatic document feeding unit 7 (so-called automatic document feeder ADF) is configured with the loading portion 21, stacker portion 31, and carrying unit 25.

In addition, as illustrated in FIG. 2, the scanning unit 5 is provided with a light source 53 configured to emit light toward the original document G, an optical element group 52 configured to collect light reflected by the original document G, and an image sensor 51 for scanning an image (including colors) formed on the original document G. Namely, the scanning unit 5 is configured to scan the image on the original document G by emitting light from the light source 53, collecting the light reflected by the original document G with the optical element group 52, and detecting, with the image sensor 51, the reflected light collected.

Further, the scanning unit 5 is configured to scan the original document G in such a position as to face the scanning position R and movable along a longitudinal direction of the main body 3 (right-to-left direction) parallel to the scanning surface 3A with a scanning unit driving mechanism (not shown).

Specifically, when scanning the original document G with the automatic document feeding unit 7, the scanning unit 5 is held in the position facing the scanning position R, and completely scans the original document G fed by the automatic document feeding unit 7. Further, when scanning the original document G placed so as to cover the scanning surface 3A (when being used as a so-called flatbed scanner), the scanning unit 5, while being shifted by the scanning unit driving mechanism, completely scans the original document G placed on the scanning surface 3A.

On the loading portion 21, a document detecting sensor 24 is disposed, which detects whether the original document G is placed on the loading portion 21. The main body 3 includes a scanning surface detecting sensor (not shown) configured to detect whether the original document G is placed on the scanning surface 3A. The document detecting sensor 24 is an optical sensor configured with a light emitting portion 24A and a light receiving portion 24B. The light emitting portion 24A and the light receiving portion 24B are disposed to face each other such that the original document G placed on the loading portion 21 blocks light emitted by the light emitting portion 24A toward the light receiving portion 24B.

Therefore, in the document detecting sensor 24, when the original document G does not exist on the loading portion 21, the light emitted by the light emitting portion 24A is detected by the light receiving portion 24B. Thus, the light receiving portion 24B issues a light receiving signal of a high signal level. Meanwhile, when the original document G exists on the loading portion 21, the light is blocked by the original document C and is not detected by the light receiving portion 24B. Thus, the light receiving portion 24B issues a light receiving signal of a low signal level.

[Configuration of Image Forming Unit]

Figure 3:
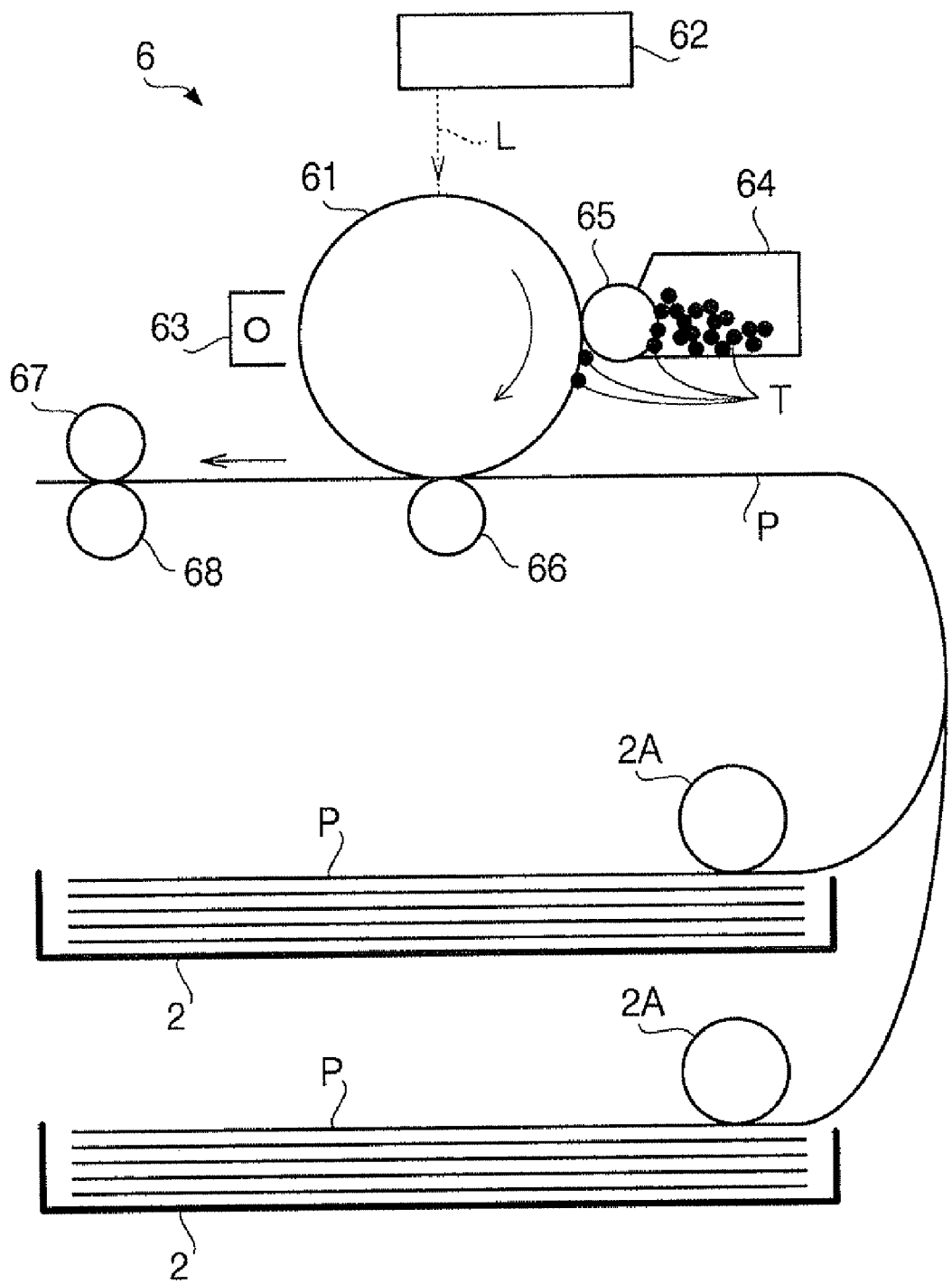
FIG. 3 is a schematic diagram showing a configuration of an image forming unit of the MFP in the embodiments according to one or more aspects of the present invention.

The image forming unit 6 is configured as shown in FIG. 3. Specifically, as illustrated in FIG. 3, the image forming unit 6 includes a photoconductive drum 61 configured to hold on a surface thereof an electrostatic latent image formed through exposure of laser light L and a scanner unit 62 configured to expose the surface of the photoconductive drum 61 with the laser light L. Additionally, the scanner unit 62 is provided with a laser diode (not shown) and a polygon mirror (not shown) and also configured in a known fashion to scan and expose the photoconductive drum 61 in a direction along a rotational axis of the photoconductive drum 61.

Further, the photoconductive drum 61 is configured to rotate in a direction indicated by an arrow in FIG. 3. Around the photoconductive drum 61, there are disposed a scorotron-type charger 63 configured to charge the surface of the photoconductive drum 61 evenly, a developing roller 65 configured to make toner T, which is developer stored in a toner cartridge 64, adhere onto the surface of the photoconductive drum 61 and develop the electrostatic latent image, and a transfer roller 66 configured to carry the sheet P pinched between itself and the photoconductive drum 61 and to transfer the toner T, which the developing roller 65 has made adhere onto the surface of the photoconductive drum 61, onto the sheet P. Further, the sheet P on which the image is formed through the transfer of the toner T is conveyed to between a heating roller 67 and a pressing roller 68, and the toner T transferred is fixed onto the sheet P.

Additionally, it is not shown in FIG. 3, yet the image forming unit 6 is a tandem type laser printer provided with respective photoconductive drums 61 for four colors cyan (C), magenta (M), yellow (Y), and black (K). After toner images of the four colors are formed, the fixing operation is performed with the heating roller 67 and the pressing roller 68.

Further, the image forming unit 6 is provided with a sheet feed roller 2A for each sheet feed cassette 2. The sheet P fed by driving any one of the sheet feed rollers 2A is supplied to between a corresponding photoconductive drum 61 and a corresponding transfer roller 66. Three or more sheet feed cassettes 2 may be provided. In this case as well, it is possible to drive an intended one of the respective sheet feed rollers 2A of the sheet feed cassettes 2.

[Explanation of Control System]

Figure 4:
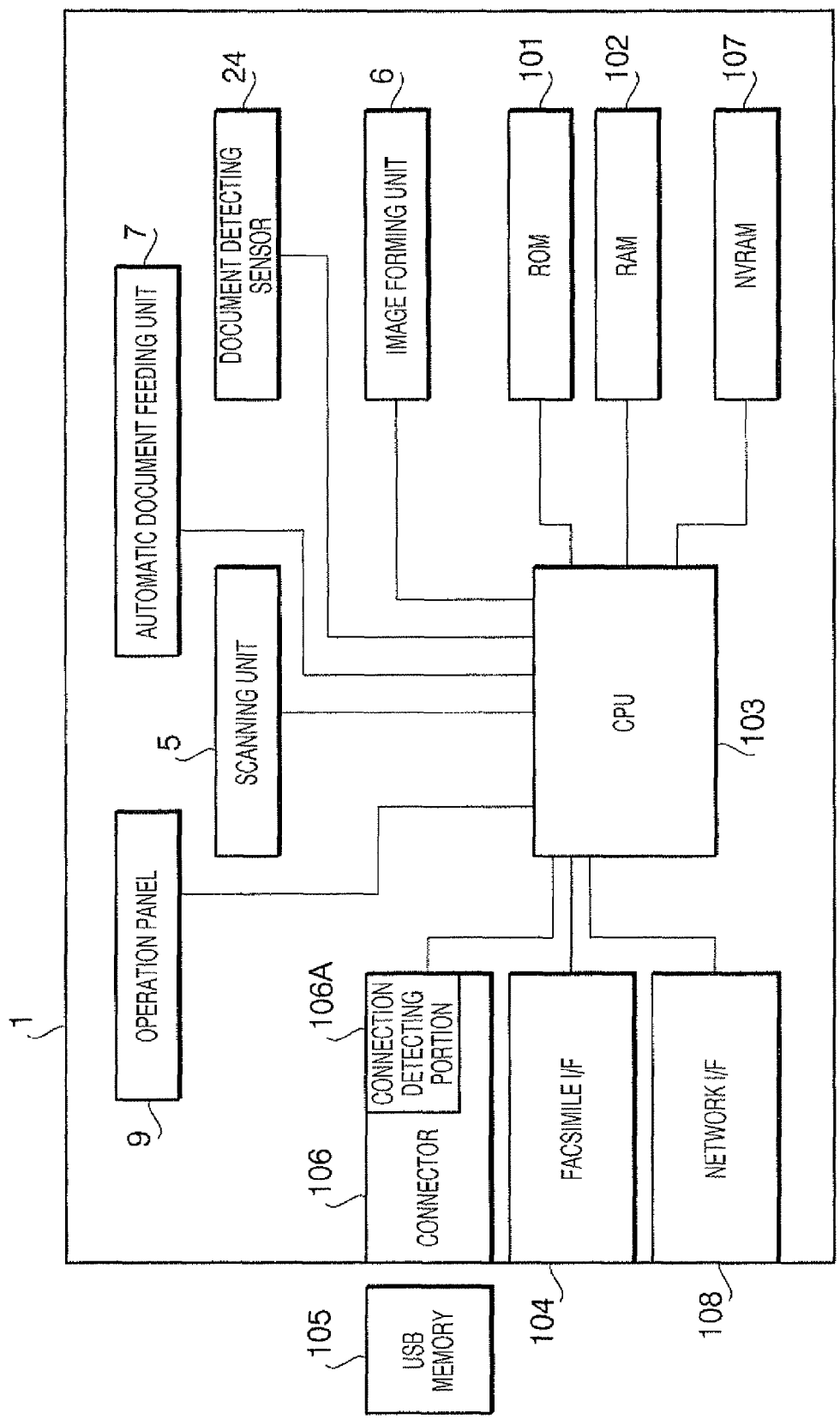
FIG. 4 is a block diagram schematically showing a control system of the MFP in the embodiments according to one or more aspects of the present invention.

FIG. 4 is a block diagram showing a configuration of a control system of the MFP 1. As illustrated in FIG. 4, The MFP 1 includes a network interface (network I/F) 108 through which the MFP 1 is connected with a network (not shown) such as a LAN, a facsimile interface (facsimile I/F) 104 through which the MFP 1 is connected with a telephone line, a connector 106 (see FIG. 1) configured such that a USB memory 105 is attached thereto or detached therefrom, a ROM 101 configured to store thereon processing programs for controlling various operations of the MFP 1, a RAM 102 configured to temporarily store thereon results of processes, a CPU 103 configured to execute the processing programs stored on the ROM 101, and a non-volatile memory (NVRAM) 107 configured to store thereon data required to be saved even after the MFP 1 is powered off. Additionally, the connector 106 is provided with a connection detecting portion 106A configured to detect whether the USB memory 105 is connected to the connector 106. Further, the CPU 103 is connected with the aforementioned scanning unit 5, image forming unit 6, automatic document feeding unit 7, operation panel 9, and document detecting sensor 24.

Control in Control System (First Embodiment)

Figure 5:
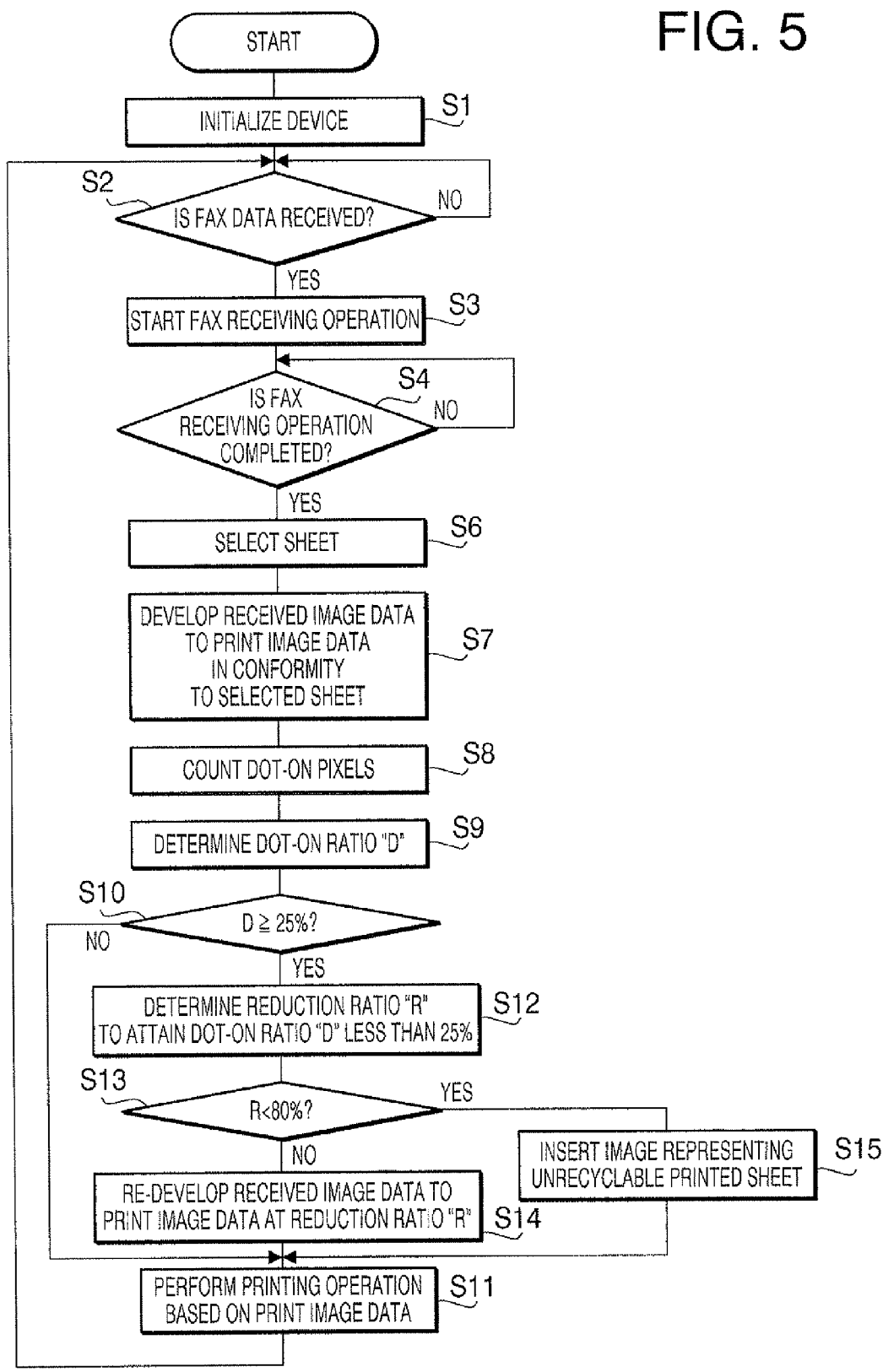
FIG. 5 is a flowchart showing a FAX receiving process to be controlled by the control system in a first embodiment according to one or more aspects of the present invention.

Subsequently, a FAX receiving process to be executed by the CPU 103 based upon a program stored on the ROM 101 in a first embodiment will be described. FIG. 5 is a flowchart showing the FAX receiving process. When the MFP 1 is powered ON, the CPU 103 begins to execute the FAX receiving process based upon the program stored on the ROM 101.

As shown in FIG. 5, firstly in S1 of the present process, initializing operations are performed, which includes warming-up of the photoconductive drums 61. In a subsequent step S2, it is determined through the facsimile interface 104 whether facsimile data is received. When the facsimile data is not received (S2: No), the CPU 103 waits in a standby state in S2 until facsimile data is received. Then, when facsimile data is received (S2: Yes), the present process goes to S3.

When an instruction to transmit by FAX the document G set on the automatic document feeding unit 7 is issued via the operation panel 9 in the standby state of the CPU 103 in S2, a known FAX transmission process is performed, and the present process goes back to S2. In the same manner, when image data is received from a personal computer via the network interface 108 in the standby state of the CPU 103 in S2, a printing process is performed, and the present process goes back to S2. Further, when a copy instruction is issued via the operation panel 9 in the standby state of the CPU 103 in S2, a copy process of copying the document G is performed, and the present process goes back to S2.

When facsimile data is received (S2: Yes), the present process goes to S3, in which a known FAX receiving operation is launched to receive the facsimile data in accordance with a predetermined protocol. In a subsequent step S4, the CPU 103 waits in a standby state until the facsimile data is completely received ($4: No). It is noted that the received facsimile data is once stored in a predetermined area of the NVRAM 107. When the facsimile data is completely received (S4: Yes), the present process goes to S6, in which a size of sheet P is selected. In S6, the size of a sheet P placed in each of the sheet feed cassettes 2 is sequentially referred to. Then, when an intended size of sheet P (A4, legal size, or letter size) suitable for the FAX receiving process placed in a sheet feed cassette 2 is found, the sheet P as placed in the sheet feed cassette 2 is selected.

In a subsequent step S7, an image corresponding to the received facsimile data (hereinafter referred to as received image data) is developed to print image data, namely, bitmap data in conformity to the sheet P selected in S6. In S8, dot-on pixels of the print image data are counted. It is noted that, when the image data is printed on the sheet P, the toner T is transferred onto points on the sheet P that correspond to the dot-on pixels of the print image data. Then, in S9, a dot-on ratio D is determined based upon the count of dot-on pixels. Specifically, in S9, a ratio of an area consisting of the dot-on pixels to a whole area on the sheet P is determined as the dot-on ratio D.

Thereafter, in S10, it is determined whether the dot-on ratio D obtained in S9 is equal to or more than 25%. The present embodiment is described under an assumption that a recycling manufacture provides a criterion that a printed sheet with a dot-on ratio D less than 25% in monochrome printing is recyclable. Therefore, in the case of the dot-on ratio D<25%, even though the print image data is printed without any modification added thereto, the printed sheet P is recyclable. When the dot-on ratio D<25% (S10: No), the present process goes to S11, in which the print image data is printed on the sheet P. Thereafter, the present process goes back to the aforementioned step S2. It is noted that, when a different criterion of the dot-on ratio D for a recyclable printed sheet is provided, the above value 25% is changed.

Meanwhile, when it is determined that the dot-on ratio is equal to or more than 25% (S10: Yes), the present process goes to S12, in which a reduction ratio R is determined to attain a dot-on ratio less than 25%. Specifically, the reduction ratio R to attain a dot-on ratio of 24% is determined by substituting the dot-on ratio D obtained in S9 into an equation "R [%]=(24/D)×100."

In a subsequent step S13, it is determined whether the reduction ratio R is less than 80%. When the reduction ratio R is equal to or more than 80% (S13: No), the received image data is re-developed to print image data (bitmap data) at the reduction ratio R in S14. Thereafter, the present process goes to S11, in which the print image data developed in S14 is printed on the sheet P. After that, the present process goes back to the aforementioned step S2.

When it is determined that the reduction ratio R is less than 80% (S13: Yes), an image representing that the printed sheet P is unrecyclable is inserted into the print image data in S15. Then, the present process goes to S11, in which the print image data developed with a normal magnification in S7 is printed on the sheet P together with the image representing an unrecyclable printed sheet. Thereafter, the present process goes back to the aforementioned step S2.

Figure 6A:
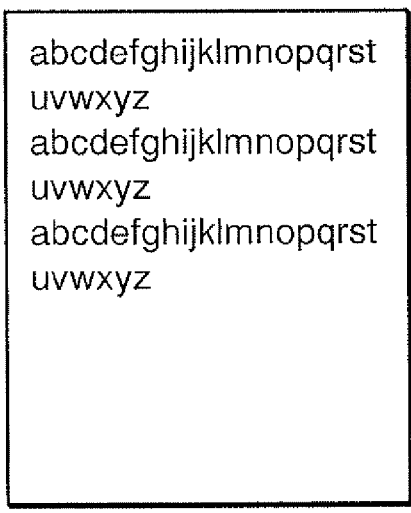
FIGS. 6A to 6C are schematic diagrams for describing an effect of the FAX receiving process in the first embodiment according to one or more aspects of the present invention.
Figure 6B:
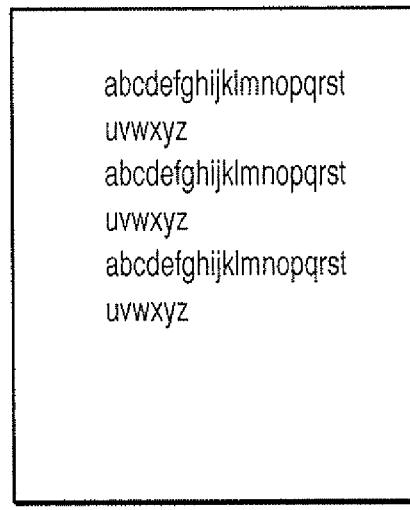

Thus, for instance, even though facsimile data is received that would cause an unrecyclable printed sheet with a dot-on ratio $D \geqq 25\%$ when the facsimile data is printed without any modification added thereto (S10: Yes), it is possible to attain a dot-on ratio $R<25\%$ through reduction printing as shown in FIG. 6B (S12 and S14) and therefore to recycle the printed sheet P. Hence, it is possible to prevent the printed sheet P from being unrecyclable.

Figure 6C:
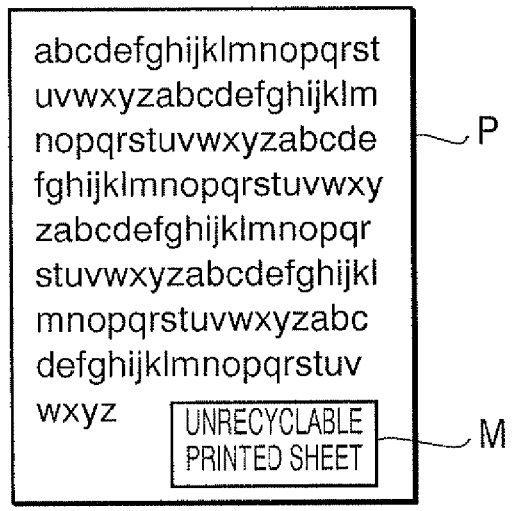

In addition, as exemplified in FIG. 6C, when facsimile data is received that needs a reduction ratio R less than 80% in order to attain a dot-on ratio $D<25\%$, the facsimile data is printed, without being reduced, with an image M representing an unrecyclable printed sheet added thereto. Therefore, it is possible to prevent the received image data from being excessively reduced and to acquire exact information from the printed image. Further, in this case, since the image M representing an unrecyclable printed sheet is inserted, a sheet P with the image M added thereto can be discriminated as an unrecyclable sheet from recyclable sheets before the recyclable sheets are delivered to the recycling manufacture.

As a method to re-develop the received image data to the print image data at the reduction ratio R in 814, a method to reduce an area of each pixel is more desired than a method to thin pixels. Thereby, exact information can be acquired from the reduced image. In particular, a resolution of facsimile data transmitted and received via a telephone line is generally 200 dpi (in the case of G3) while a resolution of the image forming unit 6 is generally 600 dpi (in the case of G3). Hence, the method to reduce an area of each pixel is more desired, and ensures the aforementioned effect that exact information can be acquired from the reduced image. Further, depending on the resolution of the image forming unit 6, the value (80% in the first embodiment) to be compared with the reduction ratio in S13 is desired to be changed.

Control in Control System (Second Embodiment)

Figure 7:
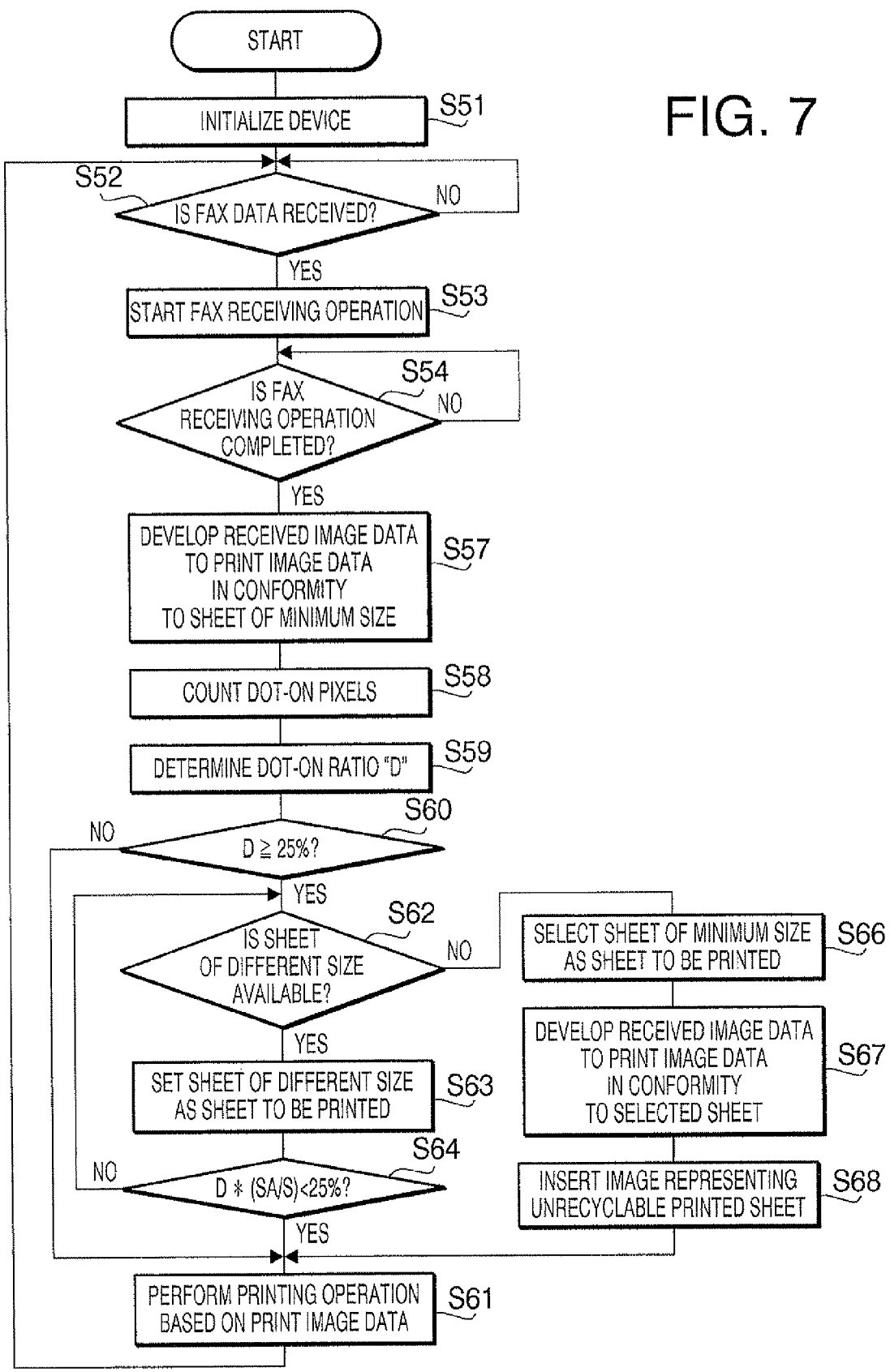
FIG. 7 is a flowchart showing a FAX receiving process in a second embodiment according to one or more aspects of the present invention.

FIG. 7 is a flowchart showing a FAX receiving process to be executed by the CPU 103 based upon a program stored on the ROM 101 in a second embodiment.

The process is also launched based upon a program stored on the ROM 101 when the MFP 1 is powered ON. In steps of S51 to S54 of the process, operations similar to the steps of S1 to S4 are executed. Specifically, the MFP 1 is initialized (S51), and then the CPU 103 waits in a standby state for facsimile data to be received (S52: No). When facsimile data is received (S52: Yes), a FAX receiving operation is launched (S53), and the CPU 103 waits in a standby state until the facsimile data is completely received (S54). When the facsimile data is completely received (S54: Yes), in a subsequent step S57, the received image data is developed to print image data (bitmap data) receiving operation in conformity to the minimum size of sheet P among two or more sizes of sheets P placed in the sheet feed cassettes 2, respectively.

In steps of S58 to S61, in the same manner as the aforementioned steps of S8 to S11, dot-on pixels of the print image data are counted (S58), and a dot-on ratio D is determined based upon the count of the dot-on pixels (S59). When the dot-on ratio D is less than 25% (S60: No), the print image data developed in S57 is printed on the sheet P (S61), the present process goes to S52. In this case, when the print image data includes a plurality of pages of data, a dot-on ratio D is determined for each page, and the maximum dot-on ratio D is applied. Thereby, sheets P of a single size are used over the plurality of pages.

Meanwhile, when the dot-on ratio D is equal to or more than 25% (S60: Yes), the present process goes to S62, in which it is determined whether a different size of sheet P is available. When a different size of sheet P (hereinafter referred to as the sheet PA to discriminate it from the firstly selected sheet P) is available (S62: Yes), the sheet PA is selected in S63. Thereafter, the present process goes to S64, in which it is determined whether $D \times (SA/S) < 25\%$ based upon an area SA of the newly selected sheet PA, an area S of the sheet P selected in S57, and the dot-on ratio D obtained in S59. In the above inequality, a left part represents a dot-on ratio when the print image data is printed on the sheet PA. In other words, in S64, it is determined whether the dot-on ratio as the left part in the inequality is less than 25%.

When $D \times (SA/S) < 25\%$ (S64: Yes), the present process goes to S61, in which the print data image developed in S57 is printed on the sheet PA. Thereafter, the present process goes back to S52. Meanwhile, when $D \times (SA/S) \geqq 25\%$ (S64: No), the present process goes to the aforementioned step S62, in which it is farther determined whether a different size of sheet P is available.

When it is determined that a different size of sheet P is not available (S62: No), the present process goes to S66, in which the minimum size of sheet P is selected. In a subsequent step S67, the received image data is developed to print image data (bitmap data) in conformity to the selected sheet P. In S68, an image representing an unrecyclable printed sheet is inserted in the print image data. After that, in S60, the print image data developed in S67 is printed along with the image representing an unrecyclable printed sheet added thereto, and then the present process goes to the aforementioned step S52.

Figure 8A:
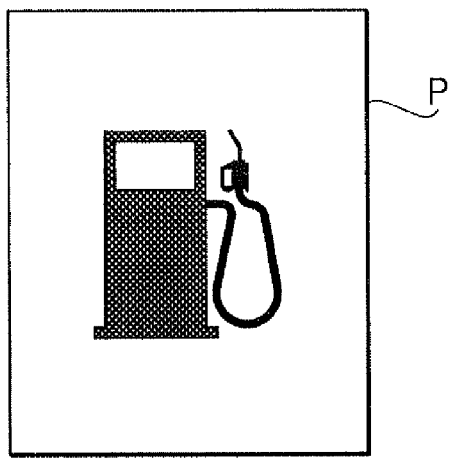
FIGS. 8A to 8C are schematic diagrams for describing an effect of the FAX receiving process in the second embodiment according to one or more aspects of the present invention.
Figure 8B:
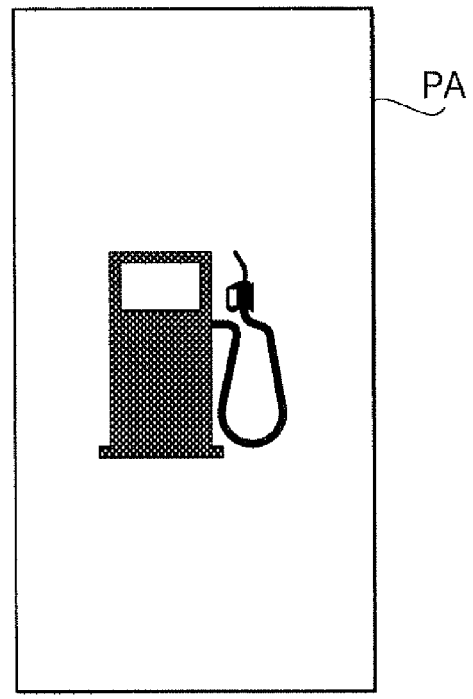

Therefore, for example, as exemplified in FIG. 8A, even though facsimile data is received that would cause an unrecyclable printed sheet with a dot-on ratio $D \geqq 25\%$ when it is printed on a sheet P of a letter size (S60: Yes), it is possible to attain a dot-on ratio D less than 25% by printing the facsimile data on a sheet P of a legal size (S64: Yes). Namely, the printed sheet P is classified as a recyclable sheet. Thus, it is possible to prevent the printed sheet P from being unrecyclable.

Figure 8C:
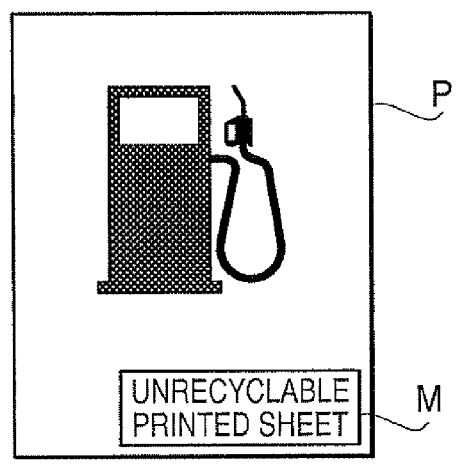

Further, as exemplified in FIG. 8C, when the dot-on ratio is equal to or more than 25% even though any size of sheet P is selected, the print image data is printed on the sheet P of the minimum size (the letter size in the second embodiment) along with the image M representing an unrecyclable printed sheet. Therefore, the sheet P with the image M added thereon can be discriminated from recyclable sheets when the recyclable sheets are delivered to the recycling manufacture. It is noted that, as a method to select a sheet P, a method to select a sheet P by determining a sheet area required for a dot-on ratio $D<25\%$ based upon the number of the dot-on pixels can be applied. However, a method in which the dot-on ratio D is sequentially determined for each size of sheet P (S62 to S64) is easier.

Control in Control System (Third Embodiment)

Figure 9:
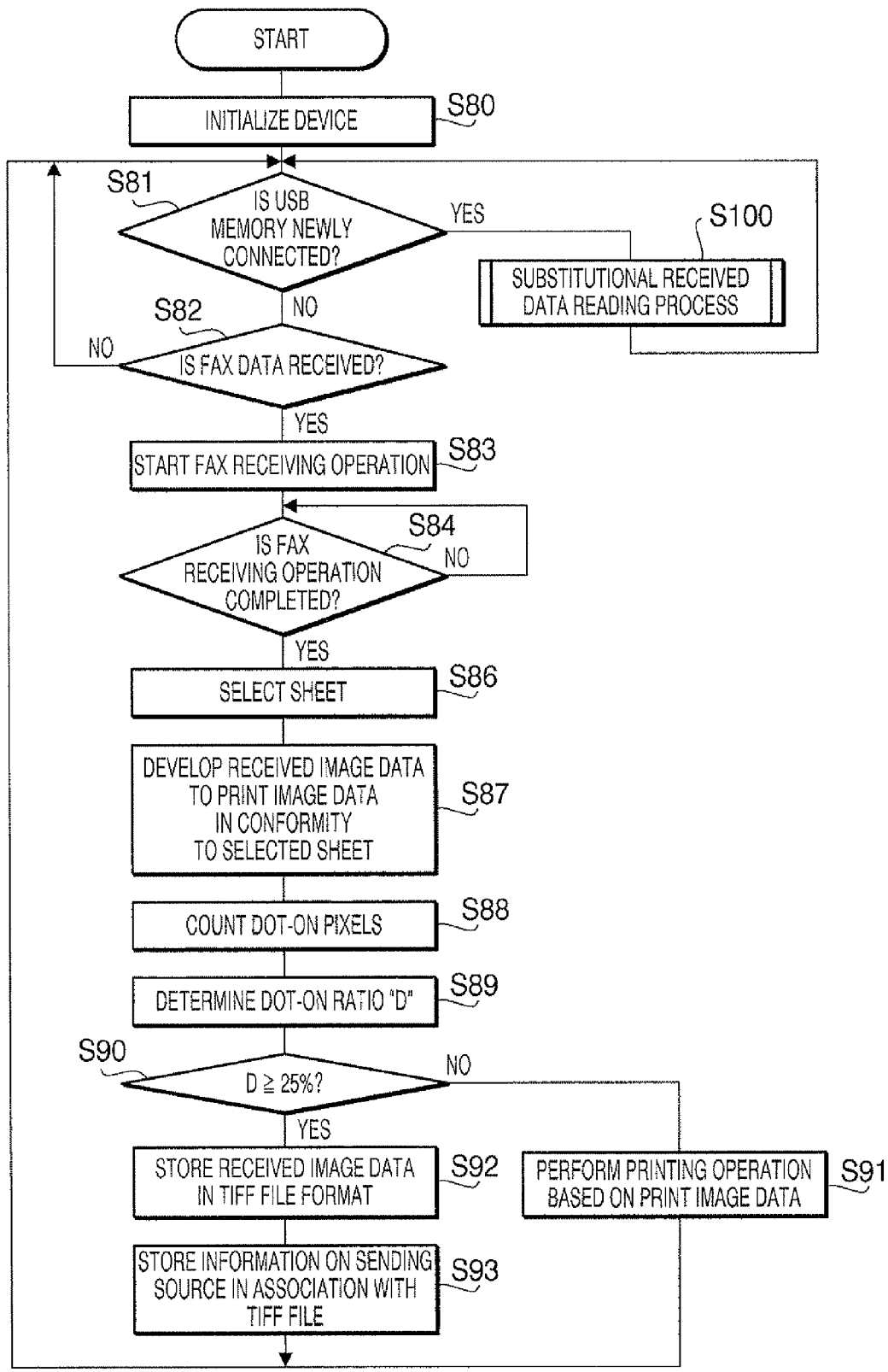
FIG. 9 is a flowchart showing a FAX receiving process in a third embodiment according to one or more aspects of the present invention.

FIG. 9 is a flowchart showing a FAX receiving process to be executed by the CPU 103 based upon a program stored on the ROM 101 in a third embodiment.

The process is also started based upon a program stored on the ROM 101 when the MFP 1 is powered ON. Firstly in S80, the MFP 1 is initialized in the same manner as S1. In S81, it is determined via the connection detecting portion 106A whether the USB memory 105 is newly connected to the connector 106. When the USB memory 105 is not connected to the connector 106 (S81: No), it is determined in S82 whether facsimile data is received. When any facsimile data is not received (S82; No), the present process goes to S81. Thus, the CPU 103 waits in a standby state until the USB memory 105 is newly connected to the connector 106 or facsimile data is received in a loop of S81 and S82.

When facsimile data is received (S82: Yes), operations similar to the aforementioned S3 to S10. Specifically, a FAX receiving operation is started (S83), and the CPU 103 waits in a standby state until the facsimile data is completely received (S84: No). Thereafter, a sheet P is selected (S86), and the received image data is developed to print image data (bitmap data) in conformity to the sheet P (S87). Subsequently, dot-on pixels of the print image data are counted (S88), and a dot-on ratio D is determined based upon the count of the dot-on pixels (S89). Then it is determined whether the dot-on ratio is equal to or more than 25% (S90). When the dot-on ratio is less than 25% (S90: No), the present process goes to S91, in which the print image data is printed on the sheet P in the same manner as the aforementioned step S11. Thereafter, the present process goes back to S81.

Meanwhile, when the dot-on ratio D is equal to or more than 25% (S90: Yes), the present process goes to S92, in which the received facsimile data is stored in a TIFF file format on the NVRAM 107 in a readable manner. In S93, information on a sending source of the facsimile data is stored in the TIFF file format on the NVRAM 107 in a readable manner. Thereafter, the present process goes back to S81. It is noted that, in facsimile data communication, in an initial stage of communication negotiation, respective piece of identification information (TEXT information) of a sending source and a receiving device are exchanged. In S93, the identification information of the sending source is used as the information on the sending source. The information on the sending source stored in S93 is stored in a predetermined area of the NVRAM 107 in association with the received facsimile data stored in S92.

Thus, in the present process, when the dot-on ratio D is equal to or more than 25% (S90: Yes), the received facsimile data is not printed and stored as a TIFF file in a readable manner on the NVRAM 107 (S92). Therefore, in the third embodiment as well, it is possible to prevent the printed sheet P from being unrecyclable.

Figure 10:
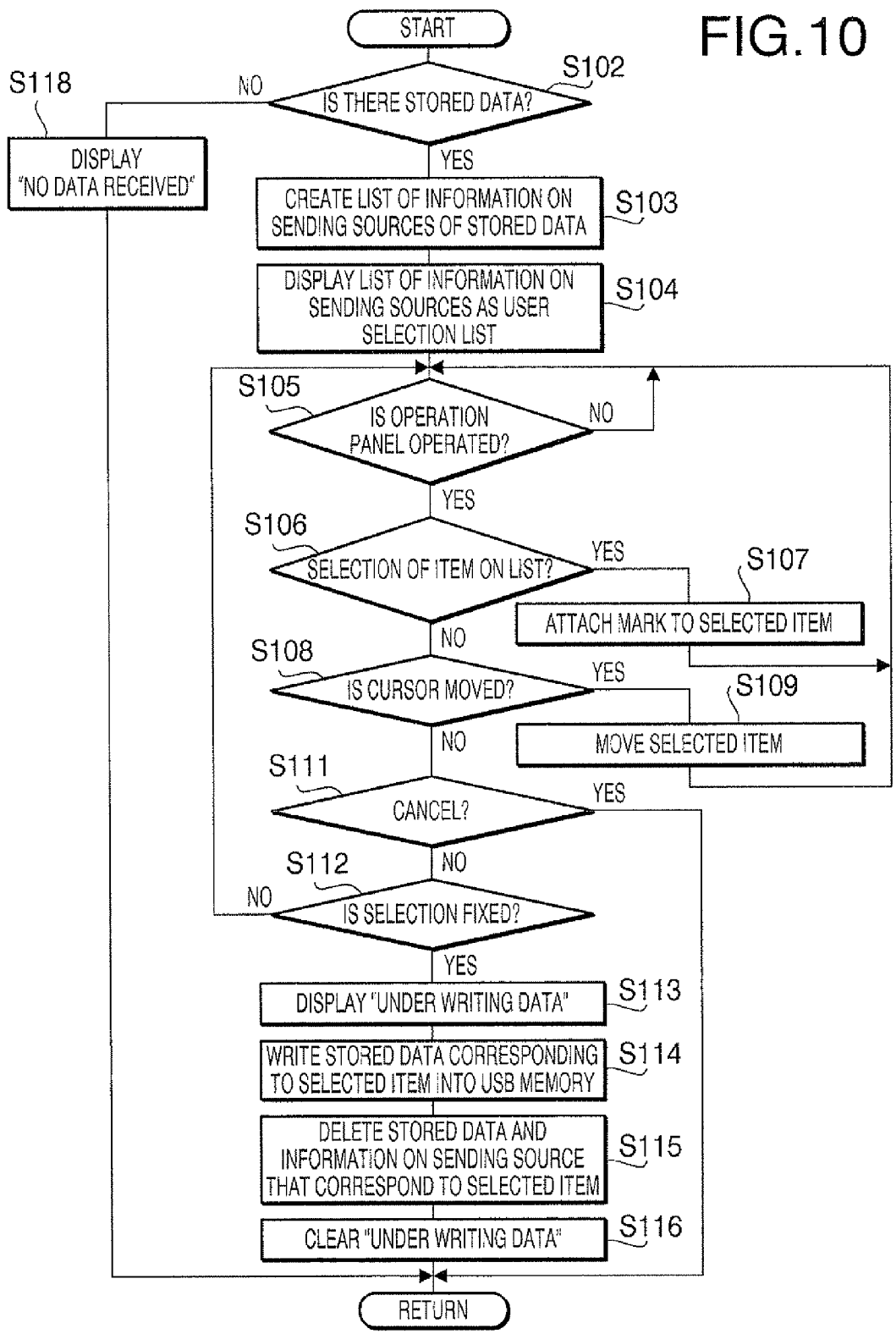
FIG. 10 is a flowchart showing a substitutional received data reading process in the FAX receiving process in the third embodiment according to one or more aspects of the present invention.

Meanwhile, in the present process, when the USB memory 105 is connected to the connector 106 while the CPU 103 is waiting in the loop of S81 and S82 (S81: Yes), a substitutional received data reading process is executed in S100. FIG. 10 is a flowchart showing a detailed substitutional received data reading process. As illustrated in FIG. 10, in the process, firstly in S102, it is determined whether there is any data stored in the aforementioned predetermined area of the NVRAM 107. When there is data stored in the aforementioned predetermined area of the NVRAM 107 (S102: Yes), the present process goes to S103.

Figure 11A:
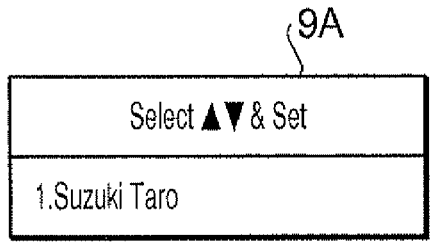
FIGS. 11A to 11H are schematic diagrams showing indications displayed on a liquid crystal display in the substitutional received data reading process in the third embodiment according to one or more aspects of the present invention.
Figure 11B:
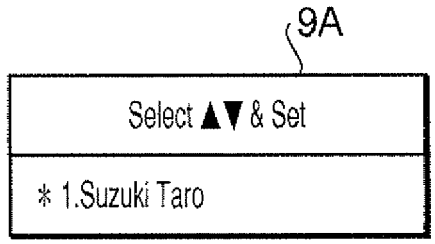

In S103, a list of information on sending sources corresponding to stored data is created. In a subsequent S104, the created list is displayed as a user selection list on the LCD 9A. For instance, when "SuzukiTaro" is stored at the top of items of the information on the sending sources, an indication as exemplified in FIG. 11A is displayed on the LCD 9A.

Back to FIG. 10, in S105, the CPU 103 waits in a standby state until the operation panel 9 is operated (S105: No). When the operation panel 9 is operated (S105: Yes), the present process goes to S106, in which it is determined whether the above key operation is for selection on the list. When the above key operation is for selection on the list (namely, a SET key is operated) (S106: Yes), in S107, a mark "*" is attached to the above indication on the LCD 9A as a mark representing a selected item. Then, the present process goes to the aforementioned step S105, in which the CPU 103 waits until a next key operation is made.

Meanwhile, when the above key operation is not for selection on the list (S106: No), in S108, it is determined whether the above key operation is made to move a cursor (namely, an up/down key is operated). When the above key operation is made to move a cursor (S108: Yes), in S109, the item of the information on the sending sources displayed on the LCD 9A is moved on the list. Thereafter, the present process goes to the aforementioned step S105.

Figure 11C:
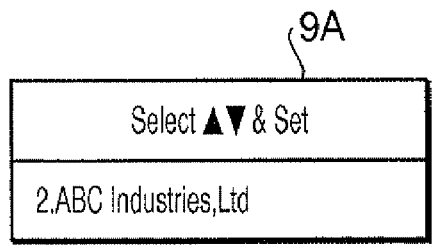
Figure 11D:
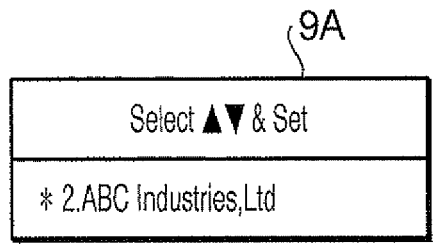
Figure 11E:
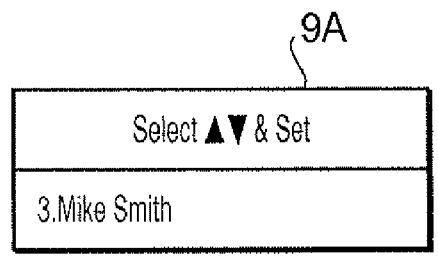
Figure 11F:
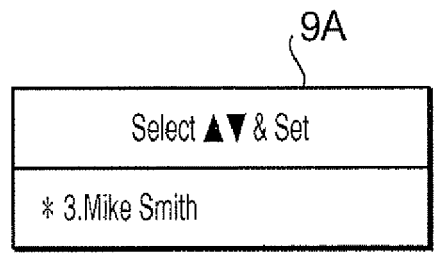

Therefore, when the up/down key is operated in the standby state in S105 (S108: Yes), as exemplified in FIG. 11C or 11E, the item of the information on the sending sources displayed on the LCD 9A is changed in S109. Then, when the SET key is operated in any state shown in FIG. 11A, 11C, or 11E (S106: Yes), the mark "*" is attached onto a left side of the item of the information on the sending sources (S107), and the item with the mark "*" attached thereto is selected.

Meanwhile, when a key other than the aforementioned keys is operated in the standby state in S105 (S108: No), it is determined in S111 whether the key operation is operation of a CANCEL key. When the key operation is operation of the CANCEL key (S111: Yes), the substitutional received data reading process is once terminated, and the present process goes to the aforementioned step S81 (see FIG. 9). Meanwhile, when the above key operation is not operation of the CANCEL key (S111: No), it is determined in S112 whether the key operation is for fixing the selection (namely, a START key is operated). Thereafter, the present process goes to S113.

Figure 11G:
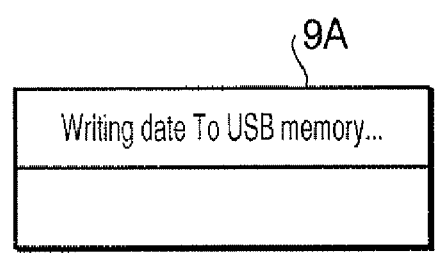

In S113, an indication representing "under writing data" as illustrated in FIG. 11G is displayed on the LCD 9A. Then, in S14, stored data corresponding to the selected item is written into the USB memory 105. In a subsequent step S115, the stored data and the information on the sending source that correspond to the selected item are deleted from the aforementioned predetermined area of the NVRAM 107. In S116, the indication representing "under writing data" is cleared, and thereafter the present process goes to the aforementioned step S81 (see FIG. 9). Thus, in the third embodiment, when a plurality of received image data are stored in the predetermined area of the NVRAM 107, intended data is selected via a key operation on the operation panel 9 and written into the USB memory 105. The data written in the USB memory 105 in this manner can be processed in a required way, for example, the data may be read as image data to be displayed on a personal computer (not shown) or printed with settings thereof such as the reduction ratio being modified.

Figure 11H:
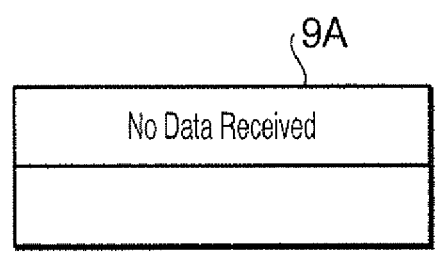

Meanwhile, when it is determined that there is not any data stored in the aforementioned predetermined area of the NVRAM 107 (S102: No), the present process goes to S118, in which an indication representing no data received is displayed as illustrated in FIG. 11H. Thereafter, the present process goes to the aforementioned step S81.

The aforementioned embodiments have been described with an example of a general facsimile machine configured to print an image corresponding to facsimile data transmitted via a telephone line as an example of a public communication line. However, the present invention may be applied to an IP facsimile machine.

Further, the present invention may be applied to image forming devices other than a multifunction peripheral and a facsimile machine. It is noted that, in a device configured to print facsimile data received via a public communication line as the aforementioned embodiments, since data is transmitted without relation to a user's intention, the effect that a printed sheet P is prevented from being unrecyclable is further remarkable.

Additionally, the aforementioned embodiments have been described under an assumption of single-side printing. However, the present invention may be applied to double-side printing as well by using an appropriate method to determine a printing ratio (dot-on ratio D). For instance, when one of surfaces of a sheet is printed, the printing ratio may be determined by dividing a printed area on the printed surface by an area of a single surface of the sheet.

Hereinabove, the embodiments according to aspects of the present invention have been described. The present invention can be practiced by employing conventional materials, methodology and equipment. Accordingly, the details of such materials, equipment and methodology are not set forth, herein in detail. In the previous descriptions, numerous specific details are set forth, such as specific materials, structures, chemicals, processes, etc., in order to provide a thorough understanding of the present invention. However, it should be recognized that the present invention can be practiced without reapportioning to the details specifically set forth. In other instances, well known processing structures have not been described in detail, in order not to unnecessarily obscure the present invention.

Only exemplary embodiments of the present invention and but a few examples of its versatility are shown and described in the present disclosure. It is to be understood that the present invention is capable of use in various other combinations and environments and is capable of changes or modifications within the scope of the inventive concept as expressed herein.

What is claimed is:

1. A printing device, comprising:
   a receiving unit configured to receive image data;
   a printing unit configured to transfer printing agent onto a sheet so as to form an image according to the image data received by the receiving unit;
   a printing ratio determining unit configured to determine, based upon the image data, a printing ratio that is a ratio of an area to be filled with the printing agent on the sheet to a whole area of the sheet;
   a first determining unit configured to determine whether the printing ratio determined by the printing ratio determining unit is equal to or more than a first predetermined value that is a printing ratio at less than which the sheet is classified into a recyclable sheet when the printing agent is transferred onto the sheet; and
   a control unit configured to control the printing unit to transfer the printing agent onto the sheet depending on the determination made by the first determining unit.

2. The printing device according to claim 1
   wherein the control unit includes a reduction ratio determining unit configured to determine a reduction ratio to attain a printing ratio less than the first predetermined value when the first determining unit determines that the determined printing ratio is equal to or more than the first predetermined value, the reduction ratio being a ratio of an area of a reduced image of an original image according to the image data to an area of the original image, and
   wherein the control unit controls the printing unit to print, on the sheet, the reduced image formed by reducing the original image at the reduction ratio determined by the reduction ratio determining unit.

3. The printing device according to claim 2,
   wherein the reduced image is formed by reducing an area of each pixel included in the original image.

4. The printing device according to claim 3,
   wherein the receiving unit includes a facsimile data receiving unit configured to receive facsimile data as the image data received by the receiving unit, via a public communication line,
   wherein the printing unit is capable of printing an image with a resolution higher than a resolution of the facsimile data received by the facsimile data receiving unit.

5. The printing device according to claim 4, further comprising an image inserting unit configured to insert, into the received image data, an image representing that the selected sheet on which the original image is to be printed is unrecyclable when the second determining unit determines that the reduction ratio is less than the second predetermined value.

6. The printing device according to claim 2,
   wherein the control unit further includes a second determining unit configured to determine whether the reduction ratio determined by the reduction ratio determining unit is less than a second predetermined value, and
   wherein the control unit controls the printing unit to print the original image on the sheet without reducing the original image when the second determining unit determines that the reduction ratio is less than the second predetermined value.

7. The printing device according to claim 1, further comprising:
   a sheet feeding unit configured to selectively feed one of a plurality of sheets of respective different sizes as the sheet to be printed by the printing unit; and
   a sheet selecting unit configured to select, from the plurality of sheets, a sheet of a size that is classified into a recyclable sheet when the printing agent is transferred thereon based upon the image data, as a sheet to be fed by the sheet feeding unit.

8. The printing device according to claim 7,
   wherein the printing ratio determining unit determines a printing ratio for each of the plurality of sheets,
   wherein the sheet selecting unit includes a recyclability determining unit configured to determine whether the printing ratio determined for each of the plurality of sheets by the printing ratio determining unit is less than a predetermined value that is a printing ratio at less than which a sheet is classified into a recyclable sheet when an image is printed on the sheet, and
   wherein the sheet selecting unit selects a sheet of the plurality of sheets for which the printing ratio is determined by the recyclability determining unit to be less than the predetermined value.

9. The printing device according to claim 8,
   wherein, when the image data received by the receiving unit includes images extending over a plurality of pages, the sheet selecting unit selects a sheet based upon the highest one of printing ratios determined for the plurality of pages.

10. The printing device according to claim 8,
    wherein, when there is no sheet for which the printing ratio is less than the predetermined value, the sheet selecting unit selects a sheet of the smallest size which is large enough for the received image data to be printed therewithin.

11. The printing device according to claim 10, further comprising an image inserting unit configured to insert, into the image data received by the receiving unit, an image representing that the sheet of the smallest size selected by the sheet selecting unit is unrecyclable when there is no sheet for which the printing ratio is less than the predetermined value.

12. The printing device according to claim 7,
wherein the receiving unit includes a facsimile data receiving unit configured to receive facsimile data as the image data received by the receiving data, via a public communication line.

13. The printing device according to claim 1,
wherein the control unit controls the printing unit to print the image according to the image data on the sheet without reducing the image when the first determining unit determines that the printing ratio is less than the first predetermined value.

14. The printing device according to claim 13, further comprising a storage unit configured to store thereon the image data when the first determining unit determines that the printing ratio is equal to or more than the predetermined value.

15. The printing device according to claim 14, further comprising:
a storage device connector configured to be connected with a storage device;
a detecting unit configured to detect whether the storage device is connected to the storage device connector;
a data selecting unit configured to accept an input to select data from image data stored on the storage unit when the detecting unit detects that the storage device is connected to the storage device connector; and
a storing unit configured to store the data selected through the data selecting unit into the storage device connected to the storage device connector.

16. The printing device according to claim 13,
wherein the receiving unit includes a facsimile data receiving unit configured to receive facsimile data as the image data received by the receiving data, via a public communication line.

17. A method to transfer printing agent onto a sheet and form an image according to image data on the sheet, comprising:
a printing ratio determining step of determining, based upon the image data, a printing ratio that is a ratio of an area to be filled with the printing agent on the sheet to a whole area of the sheet;
a first determining step of determining whether the printing ratio determined in the printing ratio determining step is equal to or more than a first predetermined value that is a printing ratio at less than which the sheet is classified into a recyclable sheet when the printing agent is transferred onto the sheet;
a reduction ratio determining step of determining a reduction ratio to attain a printing ratio less than the first predetermined value when it is determined in the first determining step that the determined printing ratio is equal to or more than the first predetermined value, the reduction ratio being a ratio of an area of a reduced image of an original image according to the image data to an area of the original image;
a reduced image forming step of forming the reduced image by reducing the original image at the reduction ratio determined in the reduction ratio determining step; and
a transferring step of transferring the printing agent onto the sheet depending on the determination made in the first determining stem the transferring step including a first printing step of printing, on the sheet, the reduced image formed in the reduced image forming step.

18. The method according to claim 17,
wherein the reduced image forming step includes a step of reducing an area of each pixel included in the original image.

19. The method according to claim 17, further comprising a second determining step of determining whether the reduction ratio determined in the reduction ratio determining step is less than a second predetermined value,
wherein the transferring step includes a second printing step of printing the original image on the sheet without reducing the original image when it is determined in the second determining step that the reduction ratio is less than the second predetermined value.

20. A printing device, comprising:
a receiving unit configured to receive image data;
a printing unit configured to transfer printing agent onto a sheet so as to form an image according to the image data received by the receiving unit;
a processor; and
a memory storing instructions that, when executed by the processor, cause the processor to:
determine, based upon the image data, a printing ratio that is a ratio of an area to be filled with the printing agent on the sheet to a whole area of the sheet;
determine whether the determined printing ratio is equal to or more than a first predetermined value that is a printing ratio at less than which the sheet is classified into a recyclable sheet when the printing agent is transferred on the sheet; and
control the printing unit to transfer the printing agent onto the sheet depending on the determination as to whether the determined printing ratio is equal to or more than the first predetermined value,
wherein, when it is determined that the determined printing ratio is equal to or more than the first predetermined value, the instructions cause the processor to:
determine a reduction ratio to attain a printing ratio less than the first predetermined value, the reduction ratio being a ratio of an area of a reduced image of an original image according to the image data to an area of the original image;
reduce the original image at the determined reduction ratio by reducing an area of each pixel included in the original image to form a reduced image; and
control the printing unit to print, on the sheet, the reduced image.

21. The printing device according to claim 20,
wherein the receiving unit includes a facsimile data receiving unit configured to receive facsimile data as the image data received by the receiving unit, via a public communication line,
wherein the printing unit is capable of printing an image with a resolution higher than a resolution of the facsimile data received by the facsimile data receiving unit.

22. The printing device according to claim 21, further comprising an image inserting unit configured to insert, into the received image data, an image representing that the selected sheet on which the original image is to be printed is unrecyclable when the second determining unit determines that the reduction ratio is less than the second predetermined value.

23. The printing device according to claim 20,
wherein the control unit further includes a second determining unit configured to determine whether the reduction ratio determined by the reduction ratio determining unit is less than a second predetermined value, and wherein the control unit controls the printing unit to print the original image on the sheet without reducing the original image when the second determining unit determines that the reduction ratio is less than the second predetermined value.

24. The printing device according to claim 20, further comprising:
a sheet feeding unit configured to selectively feed one of a plurality of sheets of respective different sizes as the sheet to be printed by the printing unit; and
a sheet selecting unit configured to select, from the plurality of sheets, a sheet of a size that is classified into a recyclable sheet when the printing agent is transferred thereon based upon the image data, as a sheet to be fed by the sheet feeding unit.

25. The printing device according to claim 24,
wherein the printing ratio determining unit determines a printing ratio for each of the plurality of sheets,
wherein the sheet selecting unit includes a recyclability determining unit configured to determine whether the printing ratio determined for each of the plurality of sheets by the printing ratio determining unit is less than a predetermined value that is a printing ratio at less than which a sheet is classified into a recyclable sheet when an image is printed on the sheet, and
wherein the sheet selecting unit selects a sheet of the plurality of sheets for which the printing ratio is determined by the recyclability determining unit to be less than the predetermined value.

26. The printing device according to claim 25,
wherein, when the image data received by the receiving unit includes images extending over a plurality of pages, the sheet selecting unit selects a sheet based upon the highest one of printing ratios determined for the plurality of pages.

27. The printing device according to claim 25,
wherein, when there is no sheet for which the printing ratio is less than the predetermined value, the sheet selecting unit selects a sheet of the smallest size which is large enough for the received image data to be printed therewithin.

28. The printing device according to claim 20,
wherein the control unit controls the printing unit to print the image according to the image data on the sheet without reducing the image when the first determining unit determines that the printing ratio is less than the first predetermined value.

29. The printing device according to claim 28, further comprising a storage unit configured to store thereon the image data when the first determining unit determines that the printing ratio is equal to or more than the predetermined value.

30. The printing device according to claim 29, further comprising:
a storage device connector configured to be connected with a storage device;
a detecting unit configured to detect whether the storage device is connected to the storage device connector;
a data selecting unit configured to accept an input to select data from image data stored on the storage unit when the detecting unit detects that the storage device is connected to the storage device connector; and
a storing unit configured to store the data selected through the data selecting unit into the storage device connected to the storage device connector.

\* \* \* \* \*